US012770027B2

(12) United States Patent
Shin et al.

(10) Patent No.: US 12,770,027 B2
(45) Date of Patent: Oct. 20, 2026

(54) METHOD AND SYSTEM FOR SUSPECT SCORING USING LAYERED NETWORK BASED ON CRIMINAL CASE AND RELATED PERSON

(71) Applicant: AJOU UNIVERSITY INDUSTRY-ACADEMIC COOPERATION FOUNDATION, Suwon-si (KR)

(72) Inventors: Hyun Jung Shin, Gyeonggi-do (KR); Jong Ho Jhee, Gyeonggi-do (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 480 days.

(21) Appl. No.: 18/533,673

(22) Filed: Dec. 8, 2023

(65) Prior Publication Data

US 2024/0378464 A1 Nov. 14, 2024

(30) Foreign Application Priority Data

May 9, 2023 (KR) ........................ 10-2023-0059854

(51) Int. Cl.
*G06N 5/00* (2023.01)
*G06N 5/022* (2023.01)
*G06Q 50/26* (2012.01)

(52) U.S. Cl.
CPC ............. *G06N 5/022* (2013.01); *G06Q 50/26* (2013.01)

(58) Field of Classification Search
CPC ................................. G06N 5/00; G06Q 50/00
See application file for complete search history.

(56) References Cited

U.S. PATENT DOCUMENTS

2024/0354840 A1* 10/2024 Pascal .................... G06Q 40/02

FOREIGN PATENT DOCUMENTS

KR 10-2228873 B1 3/2021

OTHER PUBLICATIONS

Jong Ho Jhee, et al., “Crime Network Analysis with Hierarchical Model on Heterogeneous Data”, Korean Institute of Information Scientists and Engineers, Jul. 2020, pp. 848-850.
Communication dated Jul. 18, 2025 issued by the Korean Patent Office in application No. 10-2023-0059854.
“Analysis of crime networks using hierarchical models”, Ajou University, Electronics and Telecommunications Research Institute, May 10, 2021, pp. 1-23 (24 pages total).
Francesco Calderoni, et al., “Robust Link Prediction in Criminal Networks: a case study of the Sicilian Mafia”, Expert Systems with Applications, Jun. 2020, 18 pages total.

* cited by examiner

*Primary Examiner* — Maryam A Nasri
(74) *Attorney, Agent, or Firm* — Sughrue Mion, PLLC

(57) ABSTRACT

A method of scoring suspects in a criminal case includes: obtaining a case network including a plurality of case nodes corresponding to a plurality of cases and a plurality of edges connecting different case nodes; obtaining a people network including a plurality of person nodes corresponding to a plurality of people and a plurality of edges connecting different person nodes, constructing a crime network connecting the case network and the people network through a case-person edge based on association information between a case and a person, and scoring candidate suspects using the crime network when information about a new case is obtained.

18 Claims, 9 Drawing Sheets

METHOD AND SYSTEM FOR SUSPECT SCORING USING LAYERED NETWORK BASED ON CRIMINAL CASE AND RELATED PERSON

CROSS-REFERENCE TO RELATED APPLICATION

This application claims the benefit of Korean Patent Application No. 10-2023-0059854, filed on May 9, 2023, in the Korean Intellectual Property Office, the disclosure of which is incorporated herein in its entirety by reference.

BACKGROUND

1. Field

The present disclosure relates to a method of scoring suspects in a criminal case, and more particularly, to a method of scoring suspects in a new criminal case using a layered network constructed based on multiple criminal cases and related people.

2. Description of the Related Art

With recent developments in artificial intelligence technology, the technology is being applied to various fields. Research is also being conducted to apply the artificial intelligence technology to the investigation of criminal cases.

One of the characteristics of criminal cases is that they are often interrelated. Criminal acts may have similar patterns depending on the type, and similar criminal cases may occur consecutively by the same criminal or criminal organization.

In order to apply artificial intelligence technology to the investigation of these criminal cases, it is necessary to learn and construct a network using numerous existing crime data, and research is still in progress on an optimal learning algorithm or network type for this purpose.

SUMMARY

Provided is a method of effectively scoring suspects for a new criminal case using a layered network constructed based on numerous crime data.

In addition, provided is a method that enables improvement of processing speed and reduction of processing load through an efficient search of a layered network when scoring suspects for a new criminal case.

According to an aspect of an embodiment, a method of scoring suspects in a criminal case includes: obtaining a case network including a plurality of case nodes corresponding to a plurality of cases and a plurality of edges connecting different case nodes; obtaining a people network including a plurality of person nodes corresponding to a plurality of people and a plurality of edges connecting different person nodes, constructing a crime network connecting the case network and the people network through a case-person edge based on association information between a case and a person, and scoring candidate suspects using the crime network when information about a new case is obtained.

According to an exemplary embodiment, a weight of each of the plurality of edges included in the case network corresponds to similarity between two connected case nodes, and a weight of each of the plurality of edges included in the people network corresponds to similarity between the two connected people.

According to an exemplary embodiment, the similarity between the two connected case nodes corresponds to similarity between vectors converted from respective crime reports of the two connected case nodes.

According to an exemplary embodiment, in a weight of the case-person edge, when a first person included in the people network is a person related to a first case included in the case network, a weight of a case-person edge between a first person node corresponding to the first person and a first case node corresponding to the first case is set to 1, and, when the first person is not a person related to the first case, the weight of the case-person edge between the first person node and the first case node is set to 0.

According to an exemplary embodiment, the constructing of the crime network further comprises: grouping the plurality of case nodes into a plurality of clusters; and constructing a latent network including a node corresponding to centroid of each of the plurality of clusters.

According to an exemplary embodiment, the grouping of the plurality of case nodes into a plurality of clusters comprises: performing initial clustering based on similarity between respective vectors of the plurality of case nodes; based on a cluster including a node to be analyzed from among the plurality of case nodes and each of nodes neighboring the node to be analyzed, determining a relative location of the node to be analyzed within the cluster; and defining an area of the cluster based on a result of the determining.

According to an exemplary embodiment, the scoring of suspect candidates comprises: determining a cluster including the new case; selecting at least one of a plurality of case nodes included in the determined cluster based on similarity to the new case; extracting people connected to at least one selected case node as suspect candidates; and scoring the extracted suspect candidates.

According to an exemplary embodiment, the determining of a cluster including the new case comprises: converting information about the new case into a vector; converting a dimension of the converted vector into a dimension corresponding to vectors of nodes of the latent network; calculating similarity between each of the vectors of the nodes of the latent network and the vector of which the dimension is converted; and determining a cluster of nodes with highest calculated similarity as the cluster including the new case.

According to an exemplary embodiment, the scoring of the extracted suspect candidates comprises: scoring the extracted suspect candidates based on similarity between the new case and at least one case corresponding to the selected at least one case node and similarity between a criminal of each of the at least one case and suspect candidates connected to the criminal.

According to an aspect of an embodiment, a suspect scoring system for a criminal case consisting of at least one device including a controller and a memory, the controller is configured to: obtain a case network including a plurality of case nodes corresponding to a plurality of cases and a plurality of edges connecting different case nodes; obtain a people network including a plurality of person nodes corresponding to a plurality of people and a plurality of edges connecting different person nodes; construct a crime network connecting the case network and the people network through a case-person edge based on association information between a case and a person; and score candidate suspects using the crime network when information about a new case is obtained.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
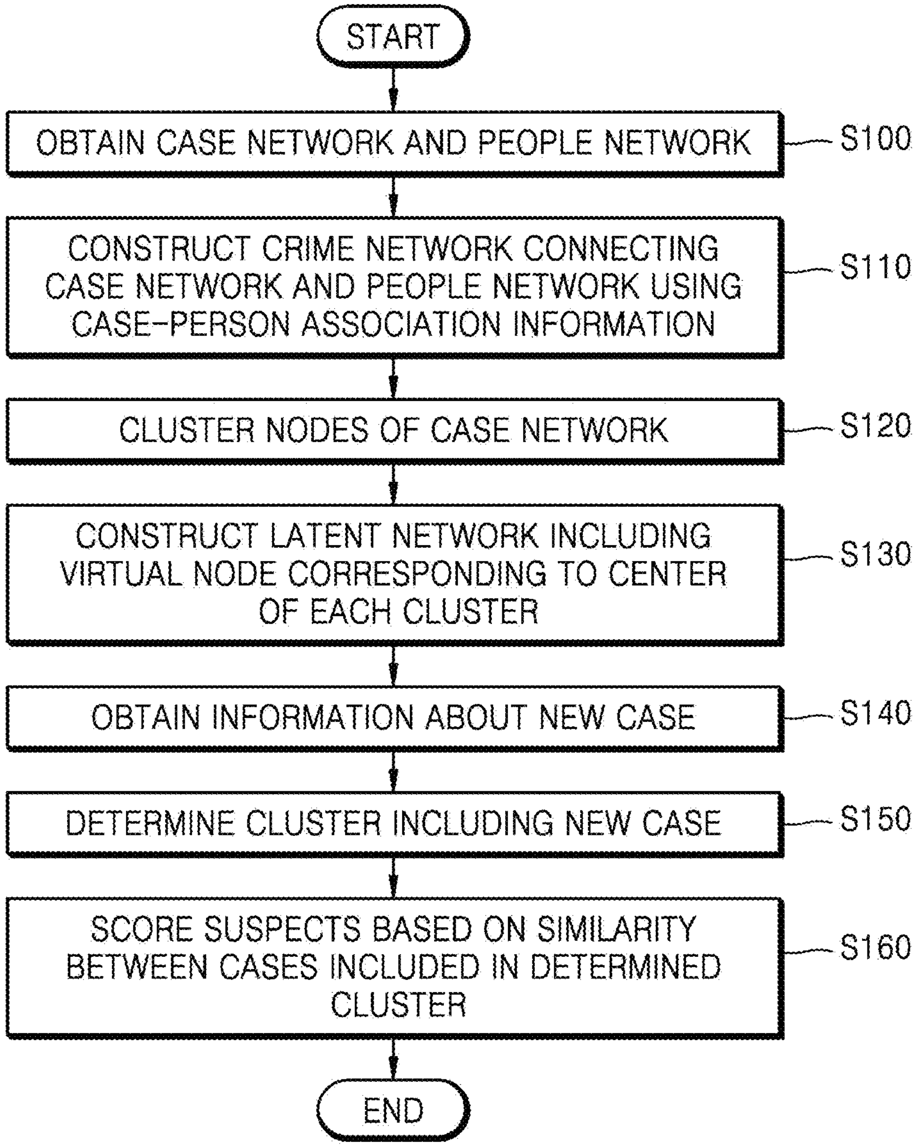
FIG. 1 is a flowchart for explaining a method of constructing a crime network and a suspect scoring method using a constructed crime network, according to an embodiment.

Embodiments according to the inventive concept are provided to more completely explain the inventive concept to one of ordinary skill in the art, and the following embodiments may be modified in various other forms and the scope of the inventive concept is not limited to the following embodiments. Rather, these embodiments are provided so that the disclosure will be thorough and complete, and will fully convey the scope of the inventive concept to one of ordinary skill in the art.

It will be understood that, although the terms first, second, etc. may be used herein to describe various members, regions, layers, sections, and/or components, these members, regions, layers, sections, and/or components should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, embodiments of the inventive concept should not be construed as being limited to the particular shapes of regions illustrated herein but may include deviations in shapes that result, for example, from manufacturing processes. Like reference numerals in the drawings denote like elements, and thus their overlapped explanations are omitted.

As used herein, the term "and/or" includes any and all combinations of one or more of the associated listed items.

Hereinafter, embodiments of the inventive concept will be described in detail with reference to the accompanying drawings.

Figure 2:
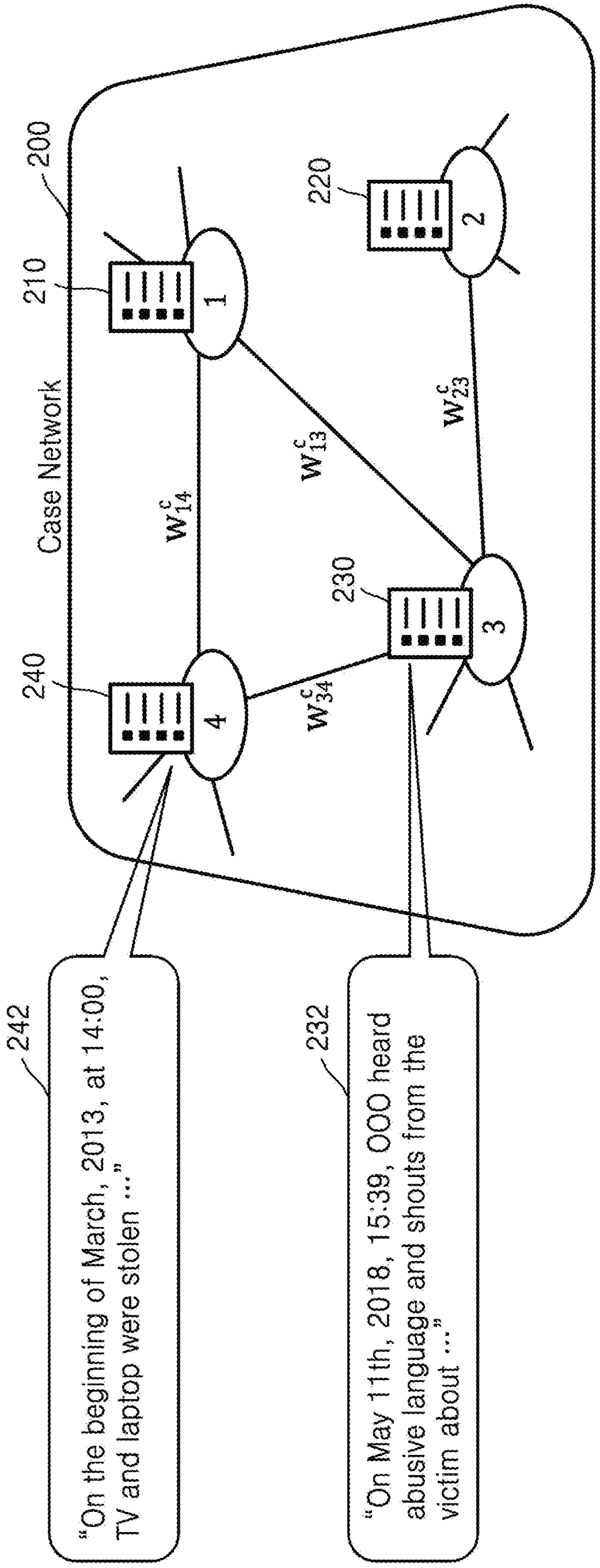
FIG. 2 is a view of a case network according to an embodiment.
Figure 3:
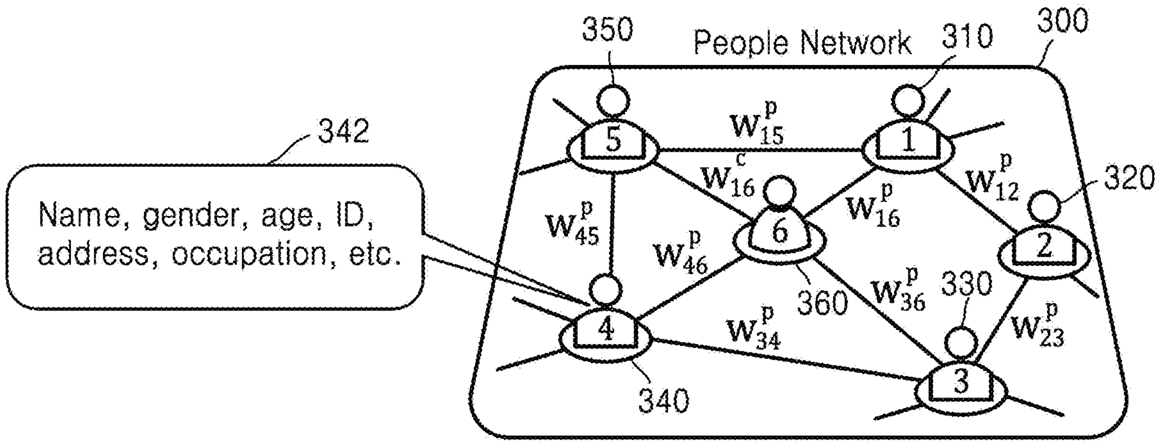
FIG. 3 is a view of a people network according to an embodiment.
Figure 4:
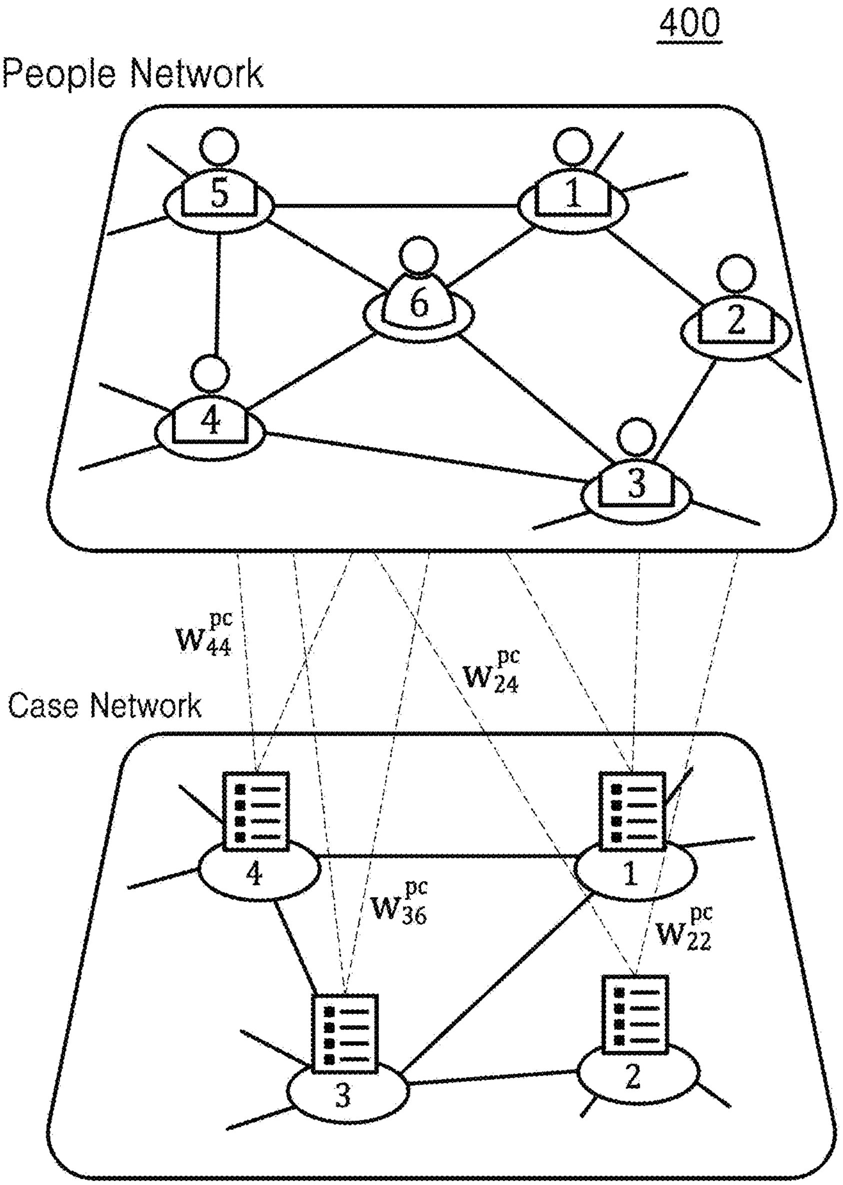
FIG. 4 is a view of a crime network constructed by connecting the networks shown in FIGS. 2 and 3.
Figure 5:
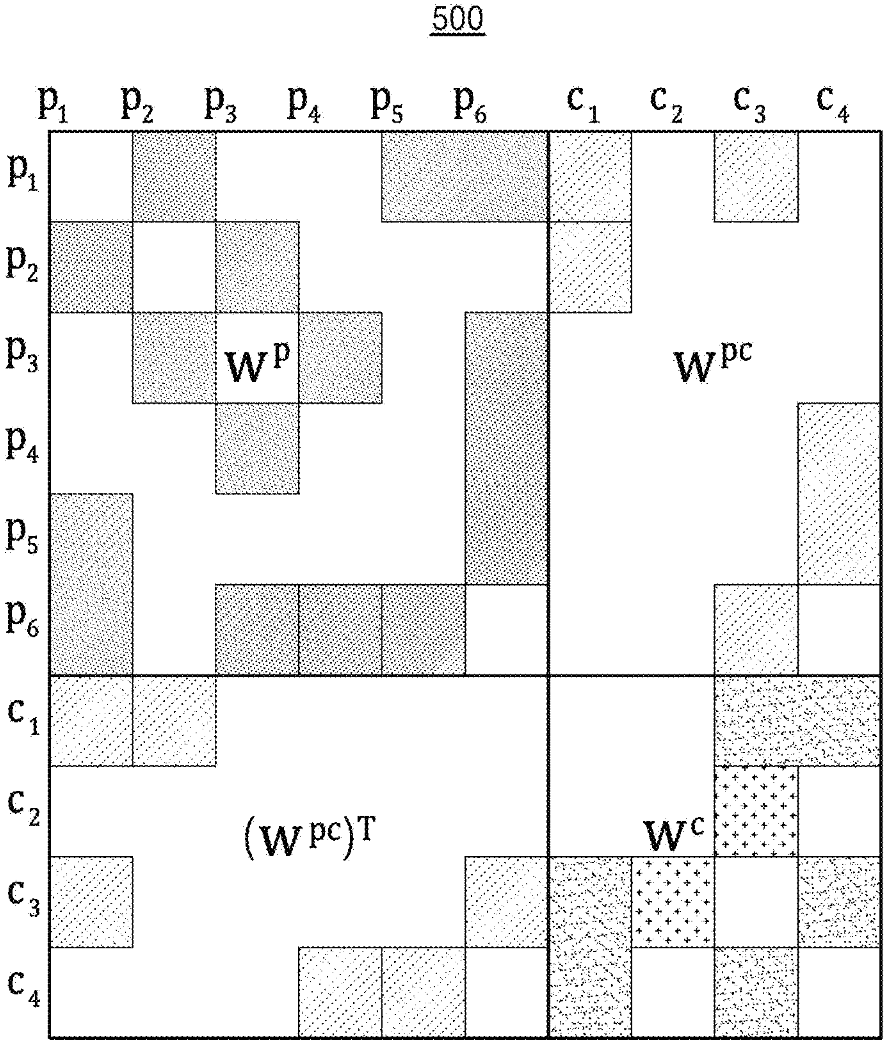
FIG. 5 is an exemplary view of a matrix showing weights according to intra-relation between nodes of the same network and weights according to inter-relation between nodes of different networks in the crime network of FIG. 4.
Figure 6:
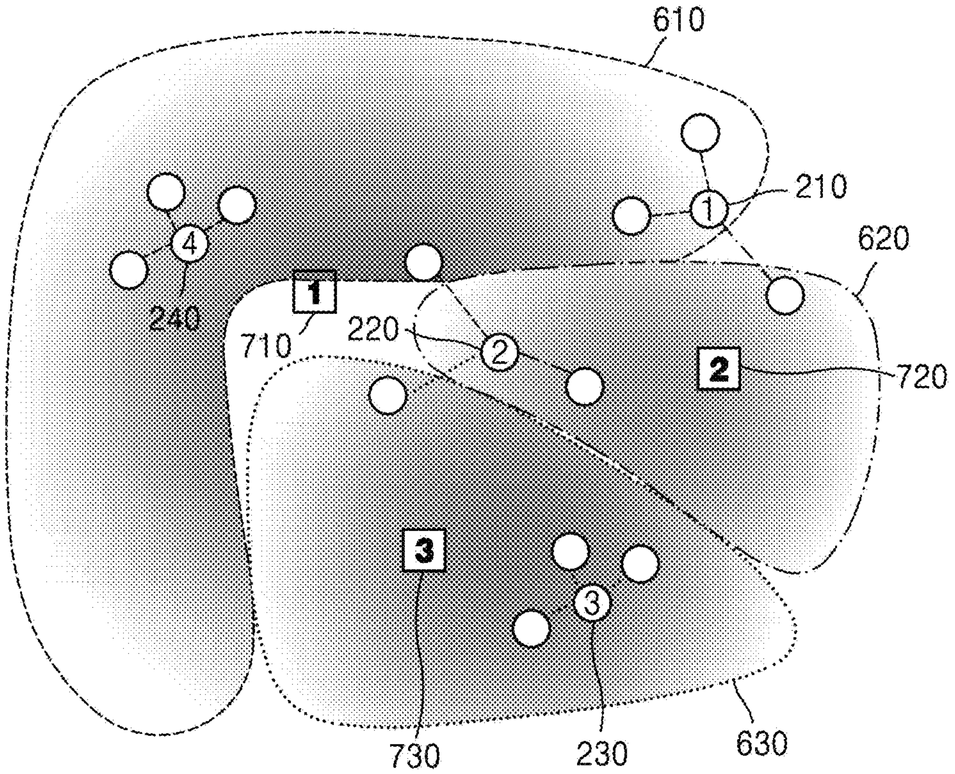
FIGS. 6 and 7 are exemplary views of a crime network with a clustering operation based on nodes included in a case network and a latent network constructed to include a node corresponding to the center of each cluster.
Figure 7:
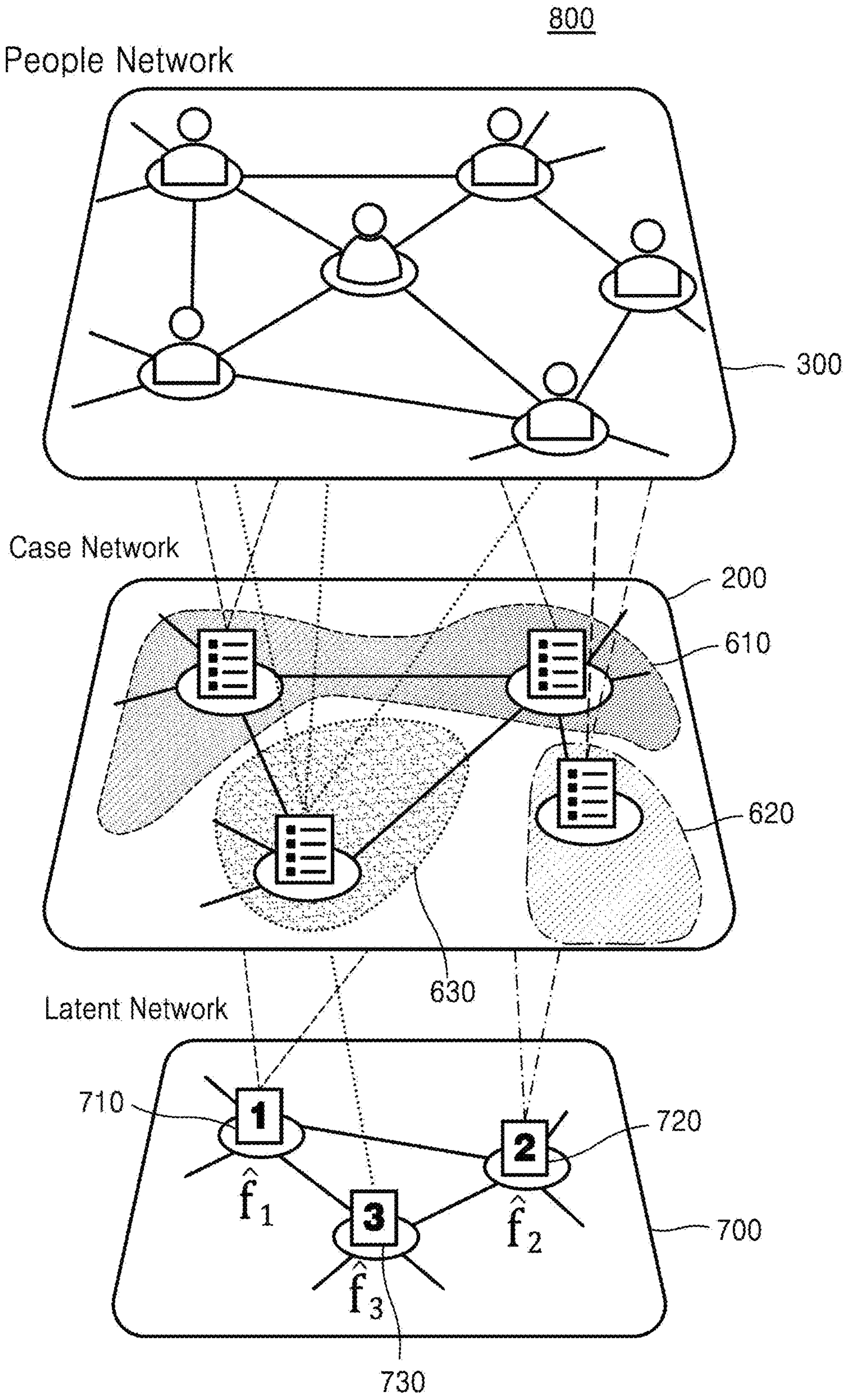
Figure 8:
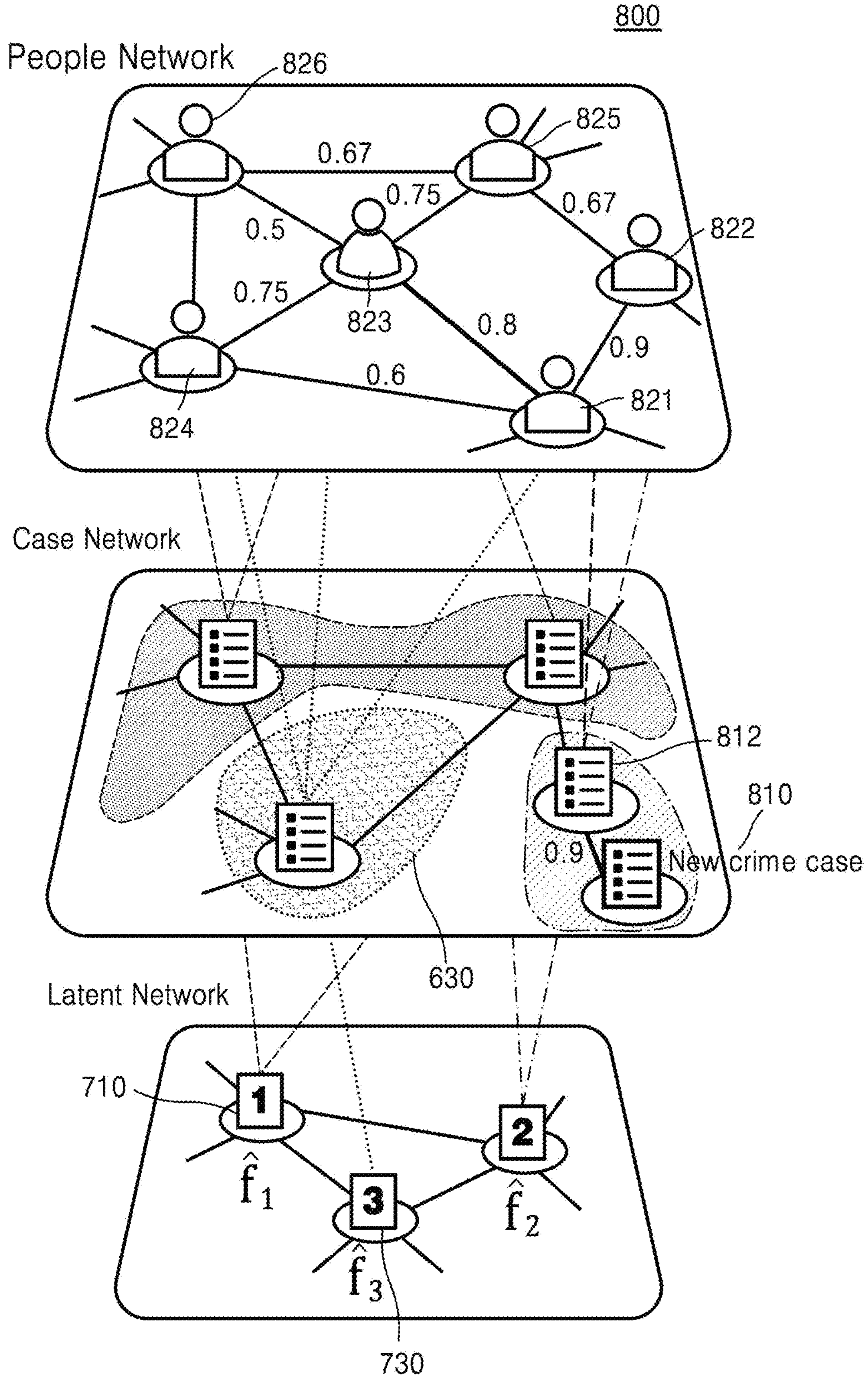
FIG. 8 is an exemplary view for explaining an operation of scoring suspects for a new case using a crime network, according to an embodiment.

FIG. 1 is a flowchart for explaining construction of a crime network and a suspect scoring method using a constructed crime network, according to an embodiment. FIG. 2 is a view of a case network according to an embodiment. FIG. 3 is a view of a people network according to an embodiment. FIG. 4 is a view of a crime network constructed by connecting the networks shown in FIGS. 2 and 3. FIG. 5 is an exemplary view of a matrix showing weights according to intra-relation between nodes of the same network and weights according to inter-relation between nodes of different networks in the crime network of FIG. 4. FIGS. 6 and 7 are exemplary views of a crime network with a clustering operation based on nodes included in a case network and a latent network constructed to include a node corresponding to the center of each cluster. FIG. 8 is an exemplary view for explaining an operation of scoring suspects for a new case using a crime network, according to an embodiment.

Criminal acts may be similar or related to each other, and similar criminal cases or copycat cases may occur consecutively by the same criminal or criminal organization. Based on this, the embodiments disclosed in this specification relate to a suspect scoring method based on criminal case data that constructs a network based on similarities or relationships based on data on various criminal cases and related people, and scores suspects for new cases through the constructed network to enable efficient investigation. However, the embodiments are not limited to criminal cases, and may also be used to analyze the relevance of people with various characteristics in new cases based on data on cases and related people in various fields (accidents, etc.).

Hereinafter, embodiments shown in FIGS. 1 to 8 will be described assuming that they are performed by a certain device. The device corresponds to a device 900 described later in FIG. 9 and may be a computing device including a control unit (processor) and memory. However, the embodiments shown in FIGS. 1 to 8 may be divided and performed by at least one device (system) constituting a server or data center.

Referring to FIG. 1, construction of a crime network and a suspect scoring method using the same according to an embodiment may include operation S100 of obtaining a case network and a people network.

Operation S100 will be described in more detail with reference to FIGS. 2 and 3.

Referring to FIGS. 2 and 3, the case network 200 may include a plurality of nodes 210, 220, 230, and 240 and at least one edge connecting the nodes. Likewise, the people network 300 may include a plurality of nodes 310, 320, 330, 340, 350, and 360 and at least one edge connecting the nodes.

The plurality of nodes 210, 220, 230, and 240 included in the case network 200 may respond to different criminal cases, respectively. Although only four nodes are shown in FIG. 2 for convenience, the case network 200 may include nodes corresponding to multiple cases.

A plurality of nodes 310, 320, 330, 340, 350, and 360 included in the people network 300 may correspond to people related to criminal cases included in the case network 200. People included in the people network 300 may be various people related to the criminal cases, such as perpetrators (criminals), victims, eyewitnesses, witnesses, and accomplices. Some characters may be related to multiple criminal cases. Although only six nodes are shown in FIG. 3 for convenience, the people network 300 may include nodes corresponding to multiple people.

A weight of an edge connecting different nodes may mean similarity between two connected nodes. For example, the similarity may have a value between 0 and 1, and the higher the similarity, the higher the value.

In more detail, in the case network 200, similarity $$w_{ij}^{c}$$

between nodes i and j may correspond to similarity between case information corresponding to node i and case information corresponding to node j (i and j are different natural numbers). The case information may be a crime report in which the location, date and type of crime, etc. are recorded in text form, and a process of converting the crime report into a vector form may be performed to measure similarity between crime reports. For example, each crime report may be converted into a high-dimensional vector form using techniques such as Term Frequency-Inverse Document Frequency (TF-IDF) or word2vec, but a conversion method is not limited thereto. For reference, TF-IDF corresponds to a method of calculating weights using term frequency and inverse document frequency of a crime report. The term frequency indicates how often the term appears in a crime report, and the inverse document frequency indicates how rarely the term appears in a crime report. According to an embodiment, a device that constructs a case network may perform vector conversion on a crime report by selecting various terms related to a criminal case and calculating a TD-IDF weight for each selected term. In addition, the similarity $$w_{ij}^{c}$$

may be determined according to similarity between converted vectors.

On the other hand, in the people network 300, similarity $$w_{ij}^{p}$$

between nodes i and j may correspond to similarity between person information corresponding to node i and person information corresponding to node j (i and j are different natural numbers). The person information may include demographic information such as age, gender, address, and occupation, and criminal information such as criminal records. In this case, the similarity $$w_{ij}^{p}$$

may be determined according to similarity of person vectors obtained by converting items included in the person information according to a certain algorithm.

The similarity $$w_{ij}^{c}$$

between cases and the similarity $$w_{ij}^{p}$$

between people may be determined through a Gaussian kernel as shown in Equation 1 below, but are not limited thereto. In Equation 1 below, $x_i$ and $x_j$ may be vectors corresponding to nodes i and j, respectively, and $\sigma$ may correspond to a bandwidth parameter.

$$w_{ij} = \exp\left(-\frac{\|x_i - x_j\|^2}{2\sigma^2}\right), \quad \text{[Equation 1]}$$

FIG. 1 will be described again.

The method may include operation S110 of constructing a crime network connecting a case network and a people network using case-person association information.

Referring to FIG. 4, the device may construct a layered network that connects the obtained case network 200 and people network 300 through a case-person edge based on association information between a case and a person. The layered network may be defined as a crime network 400 including cases and related people.

A weight $$w_{ij}^{pc}$$

of the case-person edge (i is a node in the case network, j is a node in the people network), unlike an edge weight of the case network 200 and an edge weight of the people network 300 described above in operation S100, may correspond to '1' (connected) when each person is related to the case, and may correspond to '0' (disconnected) when each person is not related to the case. When a person is related to the case, it means that the person is involved in the case in the form of a criminal, victim, witness, etc.

The crime network 400 constructed accordingly may include nodes (cases) of the case network 200, the similarity (edge weight)

$$w_{ij}^{c}$$

between the nodes of the case network 200, nodes (people) of the people network 300, the similarity (edge weight)

$$w_{ij}^{p}$$

between the nodes of the people network 300, and the weight $$w_{ij}^{pc}$$

of the case-person edge.

Referring to FIG. 5, the constructed crime network 400 may be provided in the form of a pseudo-matrix 500 or may be stored and managed in a memory of the device. The pseudo-matrix 500 may include intra-matrices and inter-matrices. In more detail, the intra-matrices may include a case intra-matrix ($W^c$) consisting of the similarity (edge weight)

$$w_{ij}^{c}$$

between the nodes of the case network 200, and a person intra-matrix $W^p$ consisting of the similarity (edge weight)

$$w_{ij}^{p}$$

between the nodes of the people network 300. In addition, the inter-matrix may include a case-person inter-matrix ($W^{pc}$, $(W^{pc})^T$) consisting of the weight $$w_{ij}^{pc}$$

of the case-person edge.

FIG. 1 will be described again.

When information about a new case is entered, the device may select a case that is most similar to the new case or a certain number of cases in which similarity thereof is greater than or equal to a reference value from among cases included in the constructed crime network 400. In addition, the device may identify a criminal of the selected case from the people network 300 and score candidate suspects based on similarity (the edge weight $$w_{ij}^{p})$$

between the criminal and each person connected to the criminal. In this case, scores of the suspect candidates will be calculated higher as the suspect candidates have similar characteristics to the criminal of the selected case. Thereafter, the device may compare characteristics of suspect candidates of which scores are at or above a reference value or characteristics of a certain number of suspect candidates extracted in order of high score with characteristics of people related to the new case, thereby determining investigation priority for the people related to the new case.

However, according to a general method, when selecting a case similar to a new case, the device needs to select the case by analyzing its similarity to all cases included in the case network 200. This causes an increase in processing load and a decrease in processing speed as the number of cases included in the case network 200 increases, which may lead to fatal problems occurring at crime scenes where urgent prediction is needed to solve the case. In particular, a vector of each case is a high-dimensional vector that is converted based on words included in a crime report, and processing load may be large when analyzing whether the cases are similar. Embodiments for solving the above-described problems will be described in detail below through operations S120 to S160 and FIGS. 6 to 8.

The method may include operation S120 of clustering nodes of a case network to obtain a plurality of clusters and operation S130 of constructing a latent network including a virtual node corresponding to the center of each cluster.

In this regard, referring to FIG. 6, the device may cluster nodes included in the case network 200. Clustering is a technique for grouping pieces of data with similar characteristics, and is used in various fields such as data mining and pattern recognition.

First, the device (or administrator) may set the number of clusters to separate nodes. The number of clusters may be preset, but is not limited thereto. The number of clusters may be related to a search range when searching for cases similar to new cases obtained later. As the number of clusters increases, the number of cases to be searched decreases, which increases search speed, but a latent dimension also increases and accuracy may relatively decrease. Therefore, the administrator may set the appropriate number of clusters considering search speed and accuracy.

The device may cluster the nodes of the case network 200 based on the set number of clusters. For example, the device may perform initial clustering on nodes based on similarity between respective vectors of the nodes of the case network 200 according to a known clustering algorithm such as a K-means algorithm or a spectral clustering algorithm. However, the known clustering algorithm is effective when data is uniformly distributed, such as a normal distribution, but because criminal case data according to the disclosure is unevenly distributed, an area of each cluster may not be accurately defined.

To solve this problem, after the initial clustering, the device according to an embodiment may check a cluster to which a specific node (e.g., a node to be analyzed) of the case network 200 and nodes neighboring the node to be analyzed belong, determine a relative position of the node to be analyzed within the cluster, and more accurately define an area of each cluster based on a result of the determination. For example, the device extracts a certain number of neighboring nodes from among nodes connected to the node to be analyzed in order of increasing edge weight, and checks whether a cluster including each extracted neighboring node is the same as the cluster including the analysis subject node, thereby estimating a relative position of the node to be analyzed within the cluster. In more detail, the more neighboring nodes belong to the same cluster as the cluster to which the node to be analyzed belongs, the more likely it is that the node to be analyzed will be located near the core (center) of the cluster. On the other hand, the greater the number of neighboring nodes belonging to a cluster different from the cluster to which the node to be analyzed belongs, the higher the probability that the node to be analyzed is located near a border of the cluster.

The device may determine centroid for each of clusters 610, 620, and 630 defined according to a clustering result. For example, the device may determine the centroid (a vector corresponding to the centroid) based on an average value of all data points (nodes) included in each of the clusters 610, 620, and 630. The centroid may be located inside a corresponding cluster, but is not limited thereto.

The device may obtain a latent network 700 including nodes 710, 720, and 730 corresponding to the determined centroid. At this time, the device may obtain a low-dimensional vector by applying a dimensionality reduction technique (principal component analysis (PCA), t-distributed stochastic neighbor embedding (t-SNE), etc.) to a vector of each of the nodes 710, 720, and 730 included in the latent network 700. For example, a vector corresponding to each of the nodes 710, 720, and 730 may be expressed as a vector (a 3D vector) with a dimension corresponding to the number of clusters.

On the other hand, these clusters may be defined to reduce a high-dimensional vector of each case node to a low-dimensional (latent dimensional) vector corresponding to the latent network 700. The size of the latent dimensional vector may be determined by the number of clusters. The value of each dimension may be determined according to the degree to which a case node belongs to each cluster, and may be measured using, for example, neighbor mutual information (NMI).

NMI of a node may refer to the amount of mutual information between a cluster and neighbors of the node. In general, the amount of mutual information for discrete random variables X and Y is defined according to Equation 2 below.

$$\sum_{x\in X}\sum_{y\in Y} p(x, y)\log\frac{p(x, y)}{p(x)p(y)} \quad \text{[Equation 2]}$$

Where p(x,y) corresponds to a joint probability of X and Y. If p(x,y)=p(x)p(y), a log becomes 0 and the amount of mutual information becomes 0, which means that X and Y are independent.

Similarly, NMI of node $x_i$ may be defined according to Equation 3 below between cluster $C_m$($C_m \in \{C_1, C_2, \ldots, C_M\}$) and neighbor set $Ne(x_i)$ of the node.

$$NMI(x_i, C_m) = \frac{\frac{|Ne(x_i)\cap C_m|}{N}}{\frac{|Ne(x_i)|}{N}\cdot\frac{|C_m|}{N}} = \frac{N\cdot|Ne(x_i)\cap C_m|}{|Ne(x_i)|\cdot|C_m|}, \quad \text{[Equation 3]}$$

Where |·| indicates cardinality, and N indicates the total number of nodes in a network. $|C_m|$ is the number of nodes belonging to cluster $C_m$, and $|Ne(x_i)|$ is the number of neighboring nodes of node $x_i$. Therefore, $|Ne(x_i)\cap C_m|$ may mean the number of nodes belonging to cluster $C_m$ from among the neighboring nodes of node $x_i$. NMI may increase as the number of neighboring nodes belonging to the cluster increases, and vice versa, it may decrease. $z_{im}$, defined in Equation 4 below, is a normalized form of Equation 3 and satisfies non-negativity and sum-to-one constraints.

$$z_{im} = \frac{NMI(x_i, C_m)}{\sum_m NMI(x_i, C_m)}. \quad \text{[Equation 4]}$$

Based on Equation 3 and Equation 4 described above, an NMI value for each cluster of node $x_i$ may be obtained, and it's matrix $z_i=[z_{i1}, z_{i2}, \ldots, z_{iM}]$ may correspond to vector Z of a latent dimension. That is, because a high-dimensional vector of each node included in the case network 200 may be converted to a low-dimensional (latent dimensional) vector, a load in a process of calculating similarity between cases may be minimized.

The device may construct a crime network 800 by connecting the obtained latent network 700 to the case network 200 and connecting the case network 200 to the people network 300. On the other hand, the latent network 700 is a virtual network and is not constructed based on actual data, and according to an embodiment, it may not be connected to the case network 200. Edges of the latent network 700 are configured to connect the nodes 710, 720, and 730 to cases included in corresponding clusters. A weight of each edge may correspond to similarity between a vector corresponding to centroid of the cluster and a vector corresponding to each node of the case network 200.

FIG. 1 will be described again.

The method may include, when information about a new case is obtained in operation S140, operation S150 of determining a cluster including the new case, and operation S160 of scoring suspects based on similarity between cases included in the determined cluster and the new case.

In this regard, referring to FIG. 8, the device may obtain information about a new case 810 through various paths, such as another device connected through a network or an input unit of the device. For example, information about the new case 810 may be information in the form of text, such as a crime report or case summary corresponding to the new case, but is not limited thereto.

The device may convert the information (crime report) about the obtained new case 810 into a vector and calculate similarity between the converted vector and the nodes 710, 720, and 730 of the latent network 700, that is, the vector corresponding to the centroid of each of the clusters 610, 620, and 630. At this time, the device may calculate the similarity after converting (reducing a dimension of) a high-dimensional vector corresponding to the new case 810 into a dimension corresponding to vectors of the nodes 710, 720, and 730 of the latent network 700. Alternatively, the device may calculate similarity between a high-dimensional vector of each of the nodes 710, 720, and 730 of the latent network 700 and the high-dimensional vector of the new case 810.

For example, the device may determine that the new case 810 is included in the cluster 620 of the node (e.g., 720) with the highest similarity as a result of the calculation. As another example, the device may, based on a similarity calculation result with each of the nodes 710, 720, and 730, estimate a location of the new case 810 within the case network 200 and determine that the new case 810 is included in a cluster including the estimated location.

When a cluster (e.g., 620) including the new case 810 is determined, the device may effectively reduce the scope of analysis by extracting only cases included in the determined cluster 620 from among all cases included in the case network 200 for similarity calculation.

The device may calculate similarity between each of the extracted cases and the new case 810, and as a result of the calculation, select a case 812 with the greatest similarity to the new case 810 as a node to be used for suspect scoring. Alternatively, the device may select cases of which similarity to the new case 810 is greater than or equal to a reference value, or select a certain number of cases in order of greatest similarity to the new case 810. The similarity may be calculated through the Gaussian kernel, etc. described above.

In order to calculate similarity between the extracted cases and the new case 810, the device may convert a high-dimensional vector of the new case 810 into a low-dimensional (latent dimensional) vector and calculate similarity between the converted vector and low-dimensional vectors of the extracted cases. The device may convert a vector ($x_{new}$) of the new case 810 into a vector ($z_{new}$) of a latent dimension using only a representation matrix of the cluster 620 including the new case 810. For example, the device may obtain a mixed weight ω from a high-dimensional vector matrix ($X_m$) and a low-dimensional vector matrix ($Z_m$) of nodes belonging to the cluster 620, and obtain a latent dimensional vector ($z_{new}=\omega x_{new}$) by applying the obtained mixed weight to the high-dimensional vector ($x_{new}$) of the new case 810. The mixing weight ω may be obtained according to Equation 5 below.

$$\omega = (Z_m^T Z_m)^{-1} Z_m^T X_m \quad \text{[Equation 5]}$$

The device may score suspect candidates 821 to 826 based on similarity between the new case 810 and the selected case 812 and similarity between the criminal 821 of the selected case 812 and the people 822 to 826 connected thereto. That is, the device may perform scoring by extracting the criminal 821 of the selected case 812 and the people 822 to 826 connected to the criminal 821 as suspect candidates.

To describe an example of scoring with reference to FIG. 8, a score of the criminal 821 of the selected case 812 may correspond to 0.9, and a score of the first person 822 may correspond to 0.81 obtained by multiplying the score of the criminal 821 by similarity (edge weight; 0.9) between the criminal 821 and the first person 822. When the same method is applied to the remaining people, a score of the second person 823 may be calculated as 0.72, a score of the third person 824 may be calculated as 0.54, a score of the fourth person 825 may be calculated as 0.54, and a score of the fifth person 826 may be calculated as 0.36. According to an embodiment, when there are multiple selected cases, the scoring process described above may be performed on a criminal and connected people in each of the selected multiple cases.

Based on a result of the scoring, those in charge of the new case (police, prosecutors, etc.) may conduct a more efficient investigation and quickly apprehend the criminal by conducting an investigation starting with people related to the new case who have similar characteristics (age, gender, occupation, criminal history, etc.) to a candidate suspect with a high score.

Figure 9:
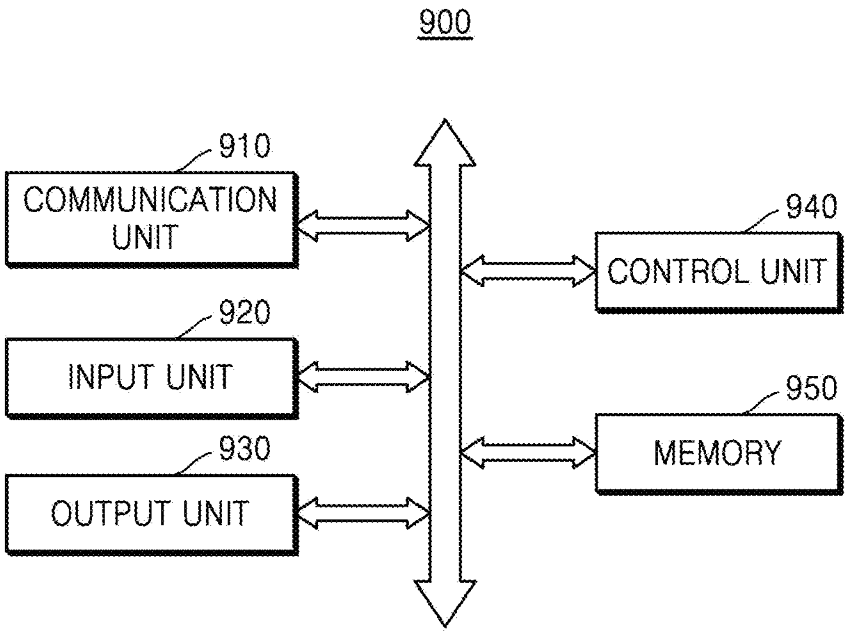
FIG. 9 is an exemplary view of a schematic control configuration of a device that performs a suspect scoring method, according to an embodiment.

FIG. 9 is an exemplary view of a schematic control configuration of a device that performs a crime network construction and suspect scoring method, according to an embodiment.

The device 900 may correspond to a computing device (server, etc.) that processes/performs a layered network (crime network) construction operation and a suspect scoring operation using the crime network, described above with reference to FIGS. 1 to 8.

Referring to FIG. 9, the device 900 may include a communication unit 910, an input unit 920, an output unit 930, a control unit 940, and a memory 950. The control configuration shown in FIG. 9 is an example for convenience of explanation, and the device 900 may include more or fewer configurations than those shown in FIG. 9.

The communication unit 910 may include one or more communication modules that enable communication with other terminals or servers by connecting the device 900 to a network. For example, the communication module may include a mobile communication module such as LTE, 5G, etc., a wireless communication module such as Wi-Fi, and/or various other wired or wireless communication modules.

The input unit 920 is a component for obtaining information such as user input, video, and audio, and may include various input devices such as various mechanical/electronic input devices, cameras, and microphones. The output unit 930 is used to provide information to users by generating output related to vision, hearing, or tactile sense, etc., and may include a display, speaker, vibration module, etc.

The control unit 940 may control operations of the device 900. The control unit 940 may process signals, data, and information input or output through the components described above, or may provide certain information or functions according to various applications or algorithms stored in the memory 950.

For example, the control unit 940 may control processes for at least some of creation of a case network, creation of a people network, construction of a crime network connecting the case network and people network, clustering of nodes of the case network, construction of a latent network, and suspect scoring for a new case, according to an embodiment.

The control unit 940 may include at least one processor, and the processor may be implemented with hardware such as a CPU, an application processor (AP), a micro controller unit (MCU), an integrated circuit, an application-specific integrated circuit (ASIC), or a field programmable gate array (FPGA).

The memory 950 may store programs and data necessary for the operation of the device 900. In addition, the memory 950 may store data generated or obtained through the control unit 940. The memory 950 may be composed of a storage medium such as ROM, RAM, flash memory, solid state disk (SSD) or hard disk drive (HDD), or a combination of storage media.

The embodiments described above may be implemented as computer-readable code on a program-recorded medium. Computer-readable media includes all types of recording devices that store data that can be read by a computer system. Examples of computer-readable media include HDD, SSD, silicon disk drive (SDD), ROM, RAM, CD-ROM, magnetic tape, floppy disk, and optical data storage devices.

According to an embodiment, the efficiency of criminal investigation may be improved by providing characteristics of latent suspects for a new criminal case through a crime network created using multiple criminal cases and related people.

In addition, according to an embodiment, by using a latent network created through a clustering technique, a high-dimensional vector of a criminal case may be reduced to a low-dimensional one, and when searching for similar cases for a new criminal case, the search range may be limited to the same cluster. Thus, processing speed may be maximized and processing load may be minimized when scoring suspect candidates. By maximizing processing speed, a criminal investigator may quickly select latent suspects at a crime scene and conduct the investigation effectively.

Effects according to the inventive concept are not limited to the effects described above, and other effects not described herein may be clearly understood by one of ordinary skill in the art from the following description.

While the disclosure has been particularly shown and described with reference to embodiments thereof, it will be understood that various changes in form and details may be made therein without departing from the scope of the following claims.

In addition, it will be apparent to one of ordinary skill in the art that various changes and modifications are possible within a range that does not deviate from the basic principles of the present disclosure.

What is claimed is:

1. A method of scoring suspects in a criminal case processed through at least one computing device, the method comprising:

obtaining a case network including a plurality of case nodes corresponding to a plurality of cases and a plurality of edges connecting different case nodes;

obtaining a people network including a plurality of person nodes corresponding to a plurality of people and a plurality of edges connecting different person nodes;

constructing a crime network connecting the case network and the people network through a case-person edge based on association information between a case and a person; and scoring candidate suspects using the crime network when information about a new case is obtained.

2. The method of claim 1, wherein a weight of each of the plurality of edges included in the case network corresponds to similarity between two connected case nodes, and a weight of each of the plurality of edges included in the people network corresponds to similarity between the two connected people.

3. The method of claim 2, wherein the similarity between the two connected case nodes corresponds to similarity between vectors converted from respective crime reports of the two connected case nodes.

4. The method of claim 1, wherein, in a weight of the case-person edge, when a first person included in the people network is a person related to a first case included in the case network, a weight of a case-person edge between a first person node corresponding to the first person and a first case node corresponding to the first case is set to 1, and, when the first person is not a person related to the first case, the weight of the case-person edge between the first person node and the first case node is set to 0.

5. The method of claim 1, wherein the constructing of the crime network further comprises:

grouping the plurality of case nodes into a plurality of clusters; and constructing a latent network including a node corresponding to centroid of each of the plurality of clusters.

6. The method of claim 5, wherein the grouping of the plurality of case nodes into a plurality of clusters comprises:

performing initial clustering based on similarity between respective vectors of the plurality of case nodes;

based on a cluster including a node to be analyzed from among the plurality of case nodes and each of nodes neighboring the node to be analyzed, determining a relative location of the node to be analyzed within the cluster; and defining an area of the cluster based on a result of the determining.

7. The method of claim 5, wherein the scoring of suspect candidates comprises:

determining a cluster including the new case;

selecting at least one of a plurality of case nodes included in the determined cluster based on similarity to the new case;

extracting people connected to at least one selected case node as suspect candidates; and scoring the extracted suspect candidates.

8. The method of claim 7, wherein the determining of a cluster including the new case comprises:

converting information about the new case into a vector;

converting a dimension of the converted vector into a dimension corresponding to vectors of nodes of the latent network;

calculating similarity between each of the vectors of the nodes of the latent network and the vector of which the dimension is converted; and determining a cluster of nodes with highest calculated similarity as the cluster including the new case.

9. The method of claim 7, wherein the scoring of the extracted suspect candidates comprises:

scoring the extracted suspect candidates based on similarity between the new case and at least one case corresponding to the selected at least one case node and similarity between a criminal of each of the at least one case and suspect candidates connected to the criminal.

10. A suspect scoring system for a criminal case consisting of at least one device including a controller and a memory, wherein the controller is configured to:

obtain a case network including a plurality of case nodes corresponding to a plurality of cases and a plurality of edges connecting different case nodes;

obtain a people network including a plurality of person nodes corresponding to a plurality of people and a plurality of edges connecting different person nodes;

construct a crime network connecting the case network and the people network through a case-person edge based on association information between a case and a person; and score candidate suspects using the crime network when information about a new case is obtained.

11. The suspect scoring system of claim 10, wherein a weight of each of the plurality of edges included in the case network corresponds to similarity between two connected case nodes, and a weight of each of the plurality of edges included in the people network corresponds to similarity between the two connected people.

12. The suspect scoring system of claim 11, wherein the similarity between the two connected case nodes corresponds to similarity between vectors converted from respective crime reports of the two connected case nodes.

13. The suspect scoring system of claim 10, wherein, in a weight of the case-person edge, when a first person included in the people network is a person related to a first case included in the case network, a weight of a case-person edge between a first person node corresponding to the first person and a first case node corresponding to the first case is set to 1, and, when the first person is not a person related to the first case, the weight of the case-person edge between the first person node and the first case node is set to 0.

14. The suspect scoring system of claim 10, wherein the controller is configured to:

group the plurality of case nodes into a plurality of clusters; and construct a latent network including a node corresponding to centroid of each of the plurality of clusters.

15. The suspect scoring system of claim 14, wherein the controller is configured to:

perform initial clustering based on similarity between respective vectors of the plurality of case nodes;

based on a cluster including a node to be analyzed from among the plurality of case nodes and each of nodes neighboring the node to be analyzed, determine a relative location of the node to be analyzed within the cluster; and define an area of the cluster based on a result of the determining.

16. The suspect scoring system of claim 14, wherein the controller is configured to:

determine a cluster including the new case;

select at least one of a plurality of case nodes included in the determined cluster based on similarity to the new case;

extract people connected to at least one selected case node as suspect candidates; and score the extracted suspect candidates.

17. The suspect scoring system of claim 16, wherein the controller is configured to:

convert the information about the new case into a vector;

convert a dimension of the converted vector into a dimension corresponding to vectors of nodes of the latent network;

calculate similarity between each of the vectors of the nodes of the latent network and the vector of which the dimension is converted; and determine a cluster of nodes with highest calculated similarity as the cluster including the new case.

18. The suspect scoring system of claim 16, wherein the controller is configured to:

score the extracted suspect candidates based on similarity between the new case and at least one case corresponding to the selected at least one case node and similarity between a criminal of each of the at least one case and suspect candidates connected to the criminal.

* * * * *